(12) United States Patent
Belias et al.

(10) Patent No.: US 6,544,382 B2
(45) Date of Patent: *Apr. 8, 2003

(54) APPARATUS FOR HIGH-SPEED HEATING AND COOLING OF A POLYMER

(75) Inventors: William P. Belias, Pittsford, NY (US); Edward M. Bullard, Rochester, NY (US); Robert T. Maddock, Ionia, NY (US)

(73) Assignee: Pactiv Corporation, Lake Forest, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/440,201

(22) Filed: Nov. 15, 1999

(65) Prior Publication Data

US 2002/0144778 A1 Oct. 10, 2002

(51) Int. Cl.⁷ .............................................. B32B 31/00
(52) U.S. Cl. ................................ 156/583.2; 156/515
(58) Field of Search ............................ 156/583.2, 515; 53/373.5

(56) References Cited

U.S. PATENT DOCUMENTS

| | | | |
|---|---|---|---|
| 2,441,940 A | 5/1948 | Rohdin | |
| 2,509,439 A | 5/1950 | Langer | |
| 2,563,858 A | 8/1951 | McGinley et al. | |
| 2,621,704 A | * 12/1952 | Langer | 156/583.2 |
| 2,676,642 A | 4/1954 | Bergstein et al. | |
| 2,682,294 A | 6/1954 | Lnager | |
| 2,698,273 A | 12/1954 | Miner et al. | |
| 2,725,091 A | 11/1955 | Miner et al. | |
| 2,941,575 A | 6/1960 | Malmberg et al. | |
| 2,978,008 A | 4/1961 | Conti | |
| 3,010,866 A | 11/1961 | Douchet | |
| 3,272,674 A | 9/1966 | Sachs et al. | |
| 3,332,204 A | 7/1967 | Frank | |
| 3,367,261 A | 2/1968 | Kashiwagi | |
| 3,384,528 A | 5/1968 | Lehmacher et al. | |
| 3,488,244 A | 1/1970 | Lepisto | |
| 3,536,567 A | 10/1970 | Harrison | |
| 3,574,039 A | 4/1971 | Fehr et al. | |

(List continued on next page.)

FOREIGN PATENT DOCUMENTS

FR  2025177  9/1970

OTHER PUBLICATIONS

PCT International Preliminary Examination Report dated Apr. 12, 2002—from International Application No. PCT/US00/41823, filed Nov. 3, 2000 (10 pages).

PCT International Search Report dated Apr. 27, 2001—from International Application No. PCT/US00/41823, filed Nov. 3, 2000 (4 pages).

*Primary Examiner*—Jeff H. Aftergut
(74) *Attorney, Agent, or Firm*—Jenkens & Gilchrist

(57) ABSTRACT

An apparatus and method for heating and cooling a polymer structure employs a tube structure. The tube structure includes a conductive tube and a conductive strip. The tube is composed of a first conductive material having a first electrical resistivity, and the strip is composed of a second conductive material having a second electrical resistivity less than the first resistivity. The strip is connected to only a portion of an outer surface of the tube and extends along a length of the tube. In the method, an impulse of electric current is passed through the tube structure until the strip is heated to a predetermined sealing temperature. The strip and the polymer structure are brought into contact with each other for a dwell time sufficient to generate a heat seal in the polymer structure. A cooling medium is passed through the tube to cool the strip to a predetermined release temperature that facilitates release of the strip from the polymer structure.

23 Claims, 2 Drawing Sheets

U.S. PATENT DOCUMENTS

| | | | |
|---|---|---|---|
| 3,660,210 A | | 5/1972 | Chapman |
| 3,672,116 A | | 6/1972 | Ingmarson |
| 3,692,613 A | * | 9/1972 | Pederson .................. 156/583.2 |
| 3,699,742 A | | 10/1972 | Giraudi |
| 3,769,132 A | | 10/1973 | Cram |
| 3,784,434 A | | 1/1974 | Paisley et al. |
| 3,787,257 A | | 1/1974 | Akerlund |
| 3,822,164 A | | 7/1974 | Guido et al. |
| 3,874,976 A | | 4/1975 | MacFarland, Jr. |
| 3,879,251 A | | 4/1975 | Ingham |
| 4,057,144 A | | 11/1977 | Schuster |
| 4,075,818 A | | 2/1978 | Wright et al. |
| 4,088,264 A | | 5/1978 | Vogt |
| 4,101,363 A | | 7/1978 | Lotto |
| 4,108,712 A | | 8/1978 | Bala et al. |
| 4,288,968 A | | 9/1981 | Seko et al. |
| 4,292,118 A | | 9/1981 | Wyslotsky |
| 4,294,882 A | | 10/1981 | Andrews et al. |
| 4,318,763 A | | 3/1982 | Bieler et al. |
| 4,353,776 A | | 10/1982 | Giulie et al. |
| 4,359,361 A | | 11/1982 | Wright |
| 4,426,244 A | | 1/1984 | Wang |
| 4,449,962 A | | 5/1984 | Copia |
| 4,475,241 A | | 10/1984 | Mueller et al. |
| 4,512,138 A | | 4/1985 | Greenawalt |
| 4,512,757 A | | 4/1985 | Dreckmann |
| 4,551,965 A | | 11/1985 | Prottengeier |
| 4,630,429 A | | 12/1986 | Christine |
| 4,757,668 A | | 7/1988 | Klinkel et al. |
| 4,761,197 A | | 8/1988 | Christine et al. |
| 4,770,289 A | | 9/1988 | Ganz |
| 4,815,602 A | | 3/1989 | Schirmer |
| 4,820,536 A | | 4/1989 | Lippincott et al. |
| 4,856,260 A | | 8/1989 | Woo et al. |
| 4,859,267 A | | 8/1989 | Knoll |
| 4,869,051 A | | 9/1989 | Shifley et al. |
| 4,902,269 A | | 2/1990 | Susini et al. |
| 4,902,369 A | | 2/1990 | Avramova et al. |
| 4,906,494 A | | 3/1990 | Babinec et al. |
| 4,909,016 A | | 3/1990 | Rentmeester et al. |
| 4,923,556 A | | 5/1990 | Kettelhoit et al. |
| 4,964,943 A | | 10/1990 | Krüger et al. |
| 4,965,985 A | | 10/1990 | Masabuchi et al. |
| 4,966,807 A | | 10/1990 | Harvey et al. |
| 4,981,546 A | * | 1/1991 | Bergevin .................. 156/583.2 |
| 5,029,432 A | | 7/1991 | Loeliger |
| 5,057,175 A | | 10/1991 | Ashton |
| 5,064,697 A | | 11/1991 | Takiguchi et al. |
| 5,073,219 A | | 12/1991 | McArdle et al. |
| 5,098,514 A | | 3/1992 | Held |
| 5,117,613 A | | 6/1992 | Pfaffmann |
| 5,158,132 A | | 10/1992 | Guillemot |
| 5,182,121 A | | 1/1993 | Miyashita et al. |
| 5,248,530 A | | 9/1993 | Jester et al. |
| 5,281,027 A | | 1/1994 | Thrall |
| 5,297,480 A | | 3/1994 | Miyashita et al. |
| 5,326,575 A | | 7/1994 | Spaulding |
| 5,346,752 A | | 9/1994 | Sawada et al. |
| 5,352,321 A | | 10/1994 | Held |
| 5,355,656 A | * | 10/1994 | Perrett ...................... 53/373.7 |
| 5,360,648 A | | 11/1994 | Falla et al. |
| 5,364,384 A | | 11/1994 | Grabenkort et al. |
| 5,395,470 A | | 3/1995 | Toh et al. |
| 5,401,546 A | | 3/1995 | Meattle |
| 5,405,565 A | | 4/1995 | Sumida et al. |
| 5,454,896 A | | 10/1995 | Harding et al. |
| 5,460,764 A | | 10/1995 | Held |
| 5,472,549 A | | 12/1995 | Jurrius et al. |
| 5,478,618 A | | 12/1995 | Rosén |
| 5,496,433 A | | 3/1996 | Miyashita et al. |
| 5,529,659 A | | 6/1996 | Ellsworth et al. |
| 5,555,798 A | | 9/1996 | Miyashita et al. |
| 5,558,015 A | | 9/1996 | Miyashita et al. |
| 5,567,485 A | | 10/1996 | Tomita et al. |
| 5,601,015 A | | 2/1997 | Röttger et al. |
| 5,626,703 A | | 5/1997 | Tomita et al. |
| 5,654,045 A | | 8/1997 | Jester |

* cited by examiner

APPARATUS FOR HIGH-SPEED HEATING AND COOLING OF A POLYMER

FIELD OF THE INVENTION

The present invention relates generally to apparatus and methods for heating and cooling polymer structures and, more particularly, relates to an apparatus and method for high-speed heating and cooling of a polymer structure.

BACKGROUND OF THE INVENTION

During the heat treatment of a polymer structure, which includes welding of two polymer sheets, it is necessary to disengage a metal surface of a heating source from the polymer surface. The polymer surface tends to adhere to the metal heating surface at high temperatures and does not release from the metal surface until the temperature is lowered to well below the melting temperature of the polymer. Most traditional heat sealing technology does not include a forced cooling cycle to expedite the cooling process; however, a couple heat sealing techniques with forced cooling cycles are proposed in U.S. Pat. No. 4,075,818 to Wright et al. and U.S. Pat. No. 4,856,260 to Woo et al. Neither of these proposed techniques is adequate because the cooling cycle time is far too long for commodity production and the cooling process does not evenly cool the heated metal surface from one end to another.

Impulse heating of a metal tube with electric current can be regulated to achieve high temperatures at a relatively high speed (e.g., 100 milliseconds) because heat is generated within the wall of the tube. To cool the metal tube, the generated heat is removed from the tube wall starting from either the inner surface of the tube, the outer surface of the tube, or both the inner and outer surfaces of the tube. A common technique for removing heat starting from the inner surface of the tube is to convey a cooling medium such as air or fluid through the tube. A common technique for removing heat from a portion (less than half) of the outer surface of the tube is to contact the tube's outer surface against a cool solid object. Heat can also be removed from the outer surface of the tube by immersing the tube in a cooled fluid. Heretofore, the overall cycle time has made it unfeasible to use impulse heating and forced cooling of the metal tube in commodity production. Also, if the metal tube is cooled by passing a cooling medium through it, the cooling medium cools the tube as it flows down the length of the tube but the cooling medium increases in temperature and becomes less effective at cooling the far end of the tube.

SUMMARY OF THE INVENTION

Accordingly, an object of the present invention is to provide an apparatus and method for high-speed heating and cooling of a polymer structure.

Another object of the present invention is to provide such an apparatus and method that minimizes temperature variations along the length of a tube structure employed in the apparatus.

These and other objects are realized by providing an apparatus for heating and cooling a polymer structure. The apparatus includes a tube structure having a conductive tube and a conductive strip. The tube is composed of a first conductive material having a first electrical resistivity, and the strip is composed of a second conductive material having a second electrical resistivity less than the first resistivity. The strip is connected to only a portion of an outer surface of the tube and extends along a length of the tube. The first and second conductive materials are selected such that passing an impulse of electric current through the tube structure induces a greater temperature increase in the strip than in the tube. To cool the heated strip, a cooling medium such as air or fluid is preferably passed through the metal tube.

A method of heating and cooling a polymer structure utilizes the above-described apparatus. In the method, an impulse of electric current is passed through the tube structure until the strip is heated to a predetermined sealing temperature; the strip and the polymer structure are brought into contact with each other for a dwell time sufficient to generate a heat seal in the polymer structure; and a cooling medium is passed through the tube to cool the strip to a predetermined release temperature that facilitates release of the strip from the polymer structure.

The above summary of the present invention is not intended to represent each embodiment, or every aspect of the present invention. This is the purpose of the figures and detailed description which follow.

BRIEF DESCRIPTION OF THE DRAWINGS

Other objects and advantages of the invention will become apparent upon reading the following detailed description and upon reference to the drawings in which.

Figure 1:
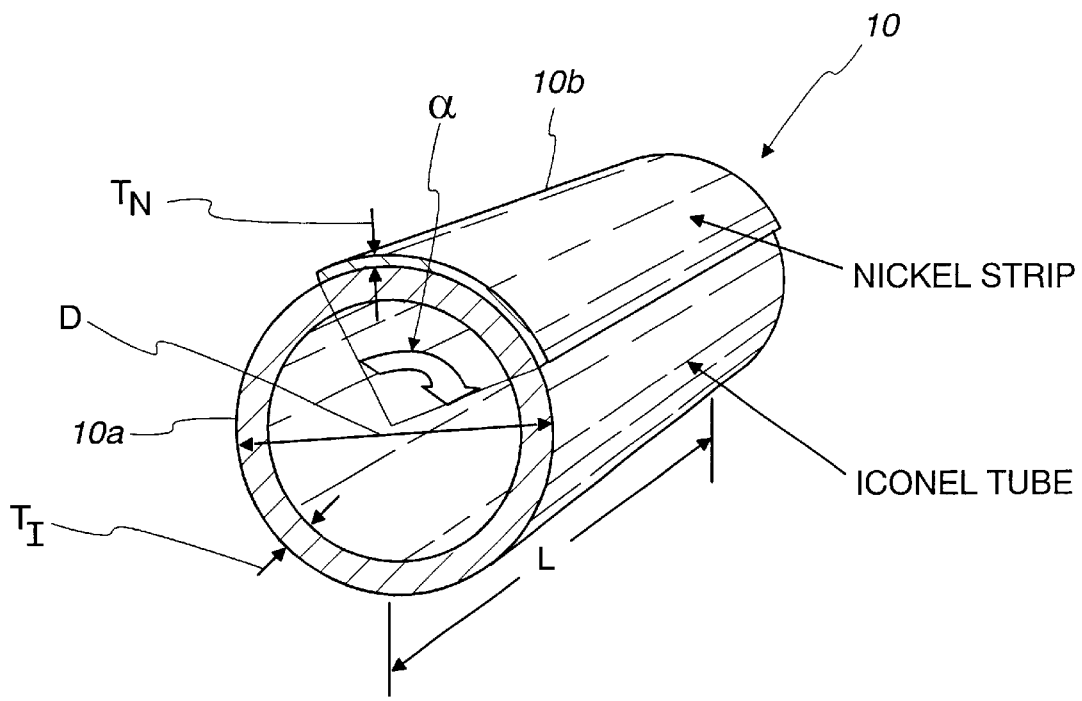
FIG. 1 is an isometric view of a tube structure used in the apparatus and method.

While the invention is susceptible to various modifications and alternative forms, a specific embodiment thereof has been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENTS

Turning now to the drawings, FIG. 1 illustrates a hollow tube structure 10 for use in an apparatus and method for heating and cooling a polymer structure. The tube structure 10 includes a conductive tube 10a and a conductive strip 10b. The tube 10a preferably has a round cross-section, but may alternatively have other regular or irregular cross-sectional shapes resembling closed polygons with three or more sides. The strip 10b is plated onto a portion of an outer surface of the tube 10a and extends along the length of the tube 10a. The tube 10a is composed of a first conductive material having a first electrical resistivity $\rho_I$ (rho), and the strip 10b is composed of a second conductive material having a second resistivity $\pi_N$ substantially less than the resistivity $\rho_I$ of the tube 10a. In a preferred embodiment, the tube 10a and the strip 10b are composed of Inconel 625 and Nickel 200, respectively. As shown in FIG. 1, the tube structure 10 can be defined by the following known parameters having the units listed in parentheses:

L=length of tube structure 10 (inches)

D=outer diameter of tube 10a (inches)

$T_I$=thickness of tube 10a (inches)

$T_N$=thickness of strip 10b (inches)

α=circumferential angle occupied by strip 10b along outer surface of tube 10a (degrees)

$A_I$=cross-sectional area of tube 10a (cmils=area of a 0.001 inch diameter circle)

$A_N$=cross-sectional area of strip 10b (cmils)

$π_I$=resistivity of tube 10a (ohms·cmil/inch)

$π_N$=resistivity of strip 10b (ohms·cmil/inch)

The circumferential angle α occupied by the strip 10b along the outer surface of the tube 10a is preferably about 180 degrees or less and is, most preferably, about 90 degrees. The thickness $T_N$ of the strip 10b is preferably less than or equal to the thickness of the thickness $T_I$ of the tube 10a.

In the method and apparatus for heating and cooling a polymer structure described below in connection with FIGS. 3a–c, a DC current source supplies a current I to the tube structure 10. Based on this current I and/or the aforementioned known parameters, the following parameters can be calculated:

$R_I$=resistance of tube 10a (ohms)

$R_N$=resistance of strip 10b (ohms)

$I_I$=current through tube 10a (amps)

$I_N$=current through strip 10b (amps)

$P_I$=power generated by tube 10a (watts)

$P_N$=power generated by strip 10b (watts)

$P/V_I$=power per unit volume generated by tube 10a (watts/cubic inch)

$P/V_N$=power per unit volume generated by strip 10b (watts/cubic inch)

Figure 2:
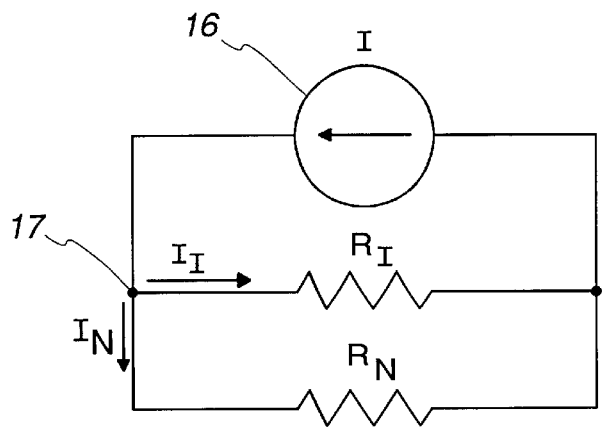
FIG. 2 is an electrical circuit for applying an impulse of electric current to the tube structure.

The currents I, $I_I$, and $I_N$ and the resistances $R_1$ and $R_N$ are shown in the electrical circuit in FIG. 2. The electrical circuit includes the DC current source 16 electrically connected in series with the parallel resistances $R_I$ and $R_N$. The current source 16 supplies the current I to node 17, which corresponds to one end of the tube structure 10. At the node 17, the current I is divided between the resistances $R_I$ and $R_N$. The current $I_I$ flows through the resistance $R_I$ of the tube 10a; the current $I_N$ flows through the resistance $R_N$ of the strip 10b. The formulas for calculating the parameters shown in the electrical circuit, as well as the power-related parameters mentioned above, are as follows:

$$R_N = \frac{\rho_N \cdot L}{A_N} \quad I_N = I \cdot \frac{R_I}{R_N + R_I} \quad P_N = I_N^2 \cdot R_N \quad P/V_N = \frac{P_N}{A_N \cdot L}$$

$$R_I = \frac{\rho_I \cdot L}{A_I} \quad I_I = I \cdot \frac{R_N}{R_N + R_I} \quad P_I = I_I^2 \cdot R_I \quad P/V_I = \frac{P_I}{A_I \cdot L}$$

Finally, the ratio of the power per unit volume $P/V_N$ generated by the low-resistivity strip 10b to the power per unit volume $P/V_I$ generated by the high-resistivity tube 10a may be calculated as follows:

$$\text{PowerRatio} = \frac{P/V_N}{P/V_I} = \frac{\frac{I_N^2 \cdot R_N}{A_N \cdot L}}{\frac{I_I^2 \cdot R_I}{A_I \cdot L}} = \frac{R_I \cdot A_I}{R_N \cdot A_N} = \frac{\rho_I}{\rho_N}$$

Thus, the PowerRatio is the ratio of the resistivity $π_I$ of the tube 10a to the resistivity $π_N$ of the strip 10b. The combination of conductive materials used to construct the tube 10a and the strip 10b are preferably chosen such that the PowerRatio, and therefore the ratio of resistivities $π_{tube}/π_{strip}$, is at least about 10. The higher the PowerRatio, the more quickly the strip 10b can be heated and then cooled after it has been heated. Examples of suitable combinations of materials for the tube 10a and the strip 10b are shown in the table below:

| Power Ratio ($\rho_{tube}/\rho_{strip}$) | Strip 10b | Nickel 200 | Yellow Brass | Aluminum 2024 | Aluminum 7075 | Aluminum 5052 | Aluminum 6061 | Aluminum 3003 | Aluminum 1100 | Gold | OFHC Copper | Silver |
|---|---|---|---|---|---|---|---|---|---|---|---|---|
| Tube 10a | ρ | 4.75 | 3.2 | 2.88 | 2.86 | 2.48 | 1.9 | 1.73 | 1.47 | 1.1 | 0.86 | 0.74 |
| Inconel 625 | 64.67 | 13.6 | 20.2 | 22.4 | 22.6 | 26.1 | 34.0 | 37.3 | 44.1 | 58.8 | 75.3 | 87.7 |
| Inconel 702 | 61.5 | 12.9 | 19.2 | 21.3 | 21.5 | 24.8 | 32.4 | 35.5 | 41.9 | 55.9 | 71.7 | 83.4 |
| Nichrome V | 54.17 | 11.4 | 16.9 | 18.8 | 19.0 | 21.9 | 28.5 | 31.3 | 36.9 | 49.2 | 63.1 | 73.4 |
| Stainless Steel 304 | 36.08 | | 11.3 | 12.5 | 12.6 | 14.6 | 19.0 | 20.8 | 24.6 | 32.8 | 42.0 | 48.9 |
| Stainless Steel 410 | 28.5 | | | 9.9 | 10.0 | 11.5 | 15.0 | 16.4 | 19.4 | 25.9 | 33.2 | 38.6 |
| Titanium | 27.58 | | | 9.6 | 9.7 | 11.1 | 14.5 | 15.9 | 18.8 | 25.1 | 32.1 | 37.4 |
| Monel 400 | 25.58 | | | | | 10.3 | 13.5 | 14.8 | 17.4 | 23.3 | 29.8 | 34.7 |
| Cupro-Nickel 30% | 18.75 | | | | | | 9.9 | 10.8 | 12.8 | 17.0 | 21.8 | 25.4 |
| Nickel-Silver 18% | 14.42 | | | | | | | | 9.8 | 13.1 | 16.8 | 19.5 |
| Low Carbon Steel 1008 | 7.17 | | | | | | | | | | | 9.7 |

In the table, the resistivity ρ is provided in ohms·cmils/inch. A suitable combination has a PowerRatio entered into the table cell located at the intersection of a row and a column. In a preferred embodiment, the tube 10a and the strip 10b are composed of Inconel 625 and Nickel 200, respectively. As shown in the table, the Inconel 625 tube 10a has a resistivity $\rho_I$ approximately equal to 64.67 ohms·cmils/inch, and the Nickel 200 strip 10b has a resistivity $π_N$ approximately equal to 4.75 ohms·cmils/inch. Looking at the intersection of the Inconel 625 row and the Nickel 200 column, it can be seen that these resistivities yield a PowerRatio of approximately 13.6.

A large PowerRatio allows the tube structure 10 to accomplish the objectives of the present invention. A large PowerRatio defines a large difference in heat generation density within the metals during the heating portion of the method for heating and cooling a polymer structure. It has been demonstrated that with a tube structure 10 composed of an Inconel, a nickle-chromium alloy, tube 10a and a Nickel strip 10b, the temperature rise in the Inconel tube 10a can be minimal while the temperature rise in the Nickel strip 10b is relatively large. For example, an Inconel tube 10a (D=0.1875 inch, $T_I$=0.004 inch) plated with a Nickel strip 10b ($T_N$=0.002 inches) that covers approximately one-fourth of the circumference of the Inconel tube 10a (α=90 degrees) will induce a temperature of approximately 600° F. at the Nickel surface but a temperature of less than 200° F. at the Inconel surface when subjected to a DC current I of 100 amps for 0.1 seconds.

If the strip 10b extends continuously along the length of the tube 10a, as shown in FIG. 2, the material of the strip 10b is preferably selected such that the difference between the coefficient of thermal expansion of the strip material and the coefficient of thermal expansion of the tube material is no greater than about 5%–10% of the coefficient of thermal expansion of the tube material. The combination of an Inconel 625 tube 10a and a Nickel 200 strip 10b is particularly advantageous because these two materials have similar coefficients of thermal expansion. The coefficient of thermal expansion for Inconel 625 is 7.1 in/in/° F.×10e–6, while the coefficient of thermal expansion for Nickel 200 is 7.9 in/in/° F.×10e–6. Due to the similar coefficients of thermal expansion, the continuous Nickel strip 10b does not crack in response to rapid rises in temperature.

Figure 3A:
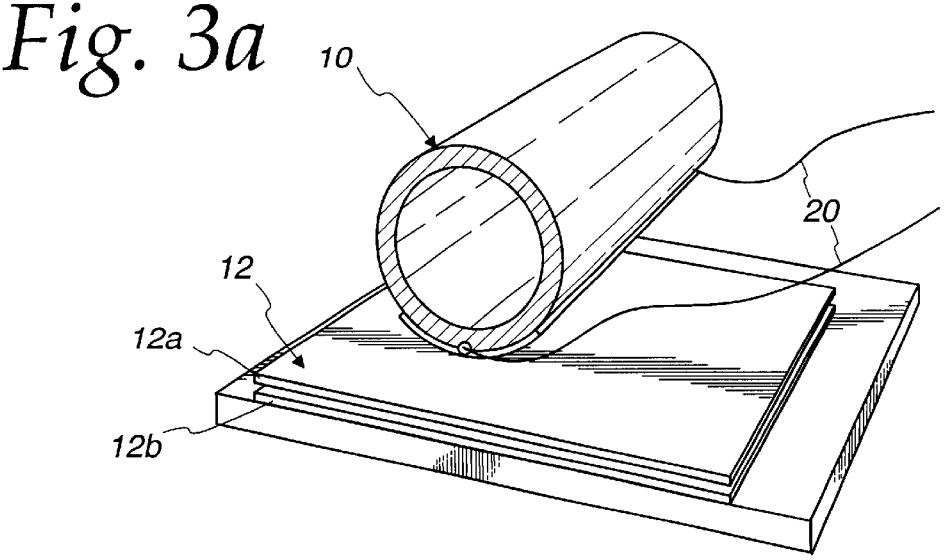
FIGS. 3a, 3b, and 3c are diagrammatic views of an apparatus and method for high-speed heating and cooling of a polymer structure.
Figure 3B:
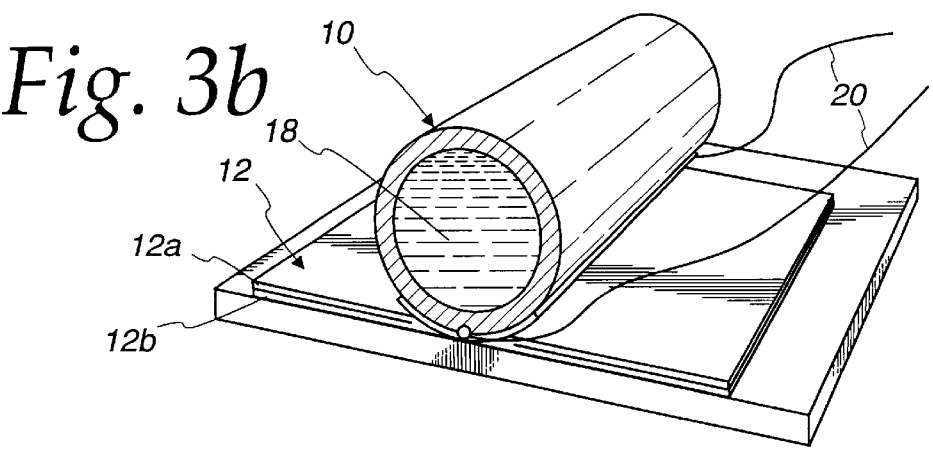
Figure 3C:
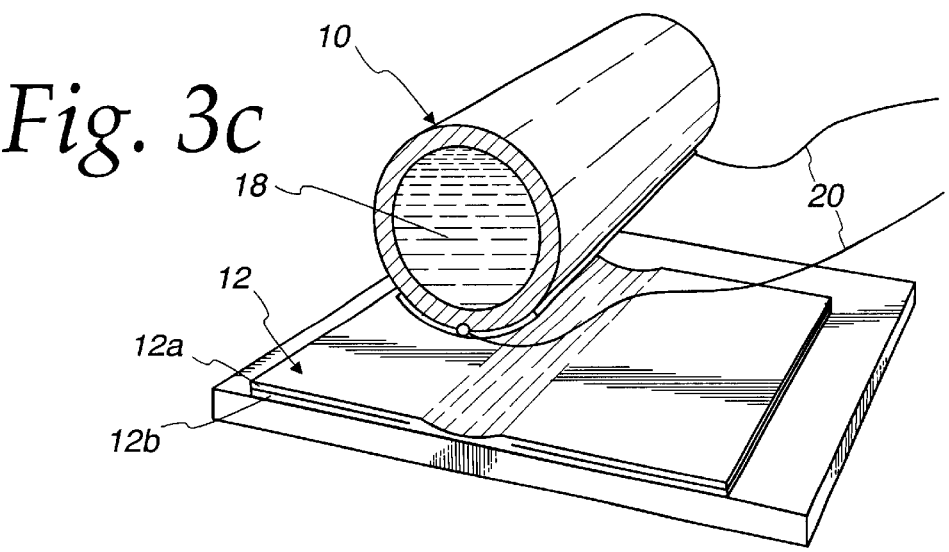

FIGS. 3a, 3b, and 3c are diagrammatic views of an apparatus and method for heating and cooling a polymer structure 12. The apparatus includes the hollow tube structure 10 (see FIG. 1), a DC current source 16 (see FIG. 2), and a cooling medium source (not shown). The tube structure 10 is electrically connected in series with the current source using electrical wires 20 and is movable between a retracted position and an extended position. In the retracted position (FIGS. 3a and 3c), the tube structure 10 is spaced from the polymer structure; in the extended position (FIG. 3b), the tube structure 10 applies pressure to the polymer structure.

In the illustrated embodiment, the polymer structure includes a pair of plastic panels 12a and 12b to be welded together by the apparatus. The plastic panels 12a and 12b may, for example, form the opposing walls of a plastic bag such as a waste bag or a food bag. The plastic panels 12a and 12b may be composed of the same or different polymers. If the panels 12a and 12b are composed of different polymers, the polymers should be compatible to the extent that they can be sealed to each other at high temperatures.

The method of heating and cooling the polymer structure includes the following steps. First, referring to FIG. 3a, the DC current source delivers an impulse of electric current to the retracted tube structure 10 via the electrical wires 20 until the low-resistivity strip 10b is heated to a predetermined sealing temperature. The thickness and composition of the plastic panels 12a and 12b determine the sealing temperature and the duration of the current impulse. For example, polyester has a higher melting point than polyethylene, and therefore the sealing temperature and/or the duration of the current impulse would need to be greater when sealing polyester panels to each other than when sealing polyethylene panels to each other.

Second, after the strip 10b is heated to the sealing temperature, the tube structure 10 is moved to the extended position in FIG. 3b. In the extended position, the strip 10b applies pressure to the surface of the upper plastic panel 12a for a dwell time sufficient to impart a seal between the panels 12a and 12b. In an alternative embodiment, the strip 10b is heated to the sealing temperature while it is in contact with the polymer structure 12.

Third, while the strip 10b is still in contact with the polymer structure 12, the cooling medium source forces a cooling medium 18 such as fluid (water or anti-freeze) or air through the tube 10a. The cooling medium 18 preferably has a temperature of about 40° F. or slightly less. The cooling medium 18 cools the tube structure 10 starting from the inner surface of the tube 10a and ultimately reaching the strip 10b, which is cooled to a predetermined release temperature that facilitates release of the strip 10b from the panel 12a. An advantage of using fluid as the cooling medium 18 is that it has a greater heat capacity than air and therefore will cool the strip 10b more quickly. An advantage of using air is that it is cleaner and easier to access than fluid.

Fourth, after the strip 10b has been cooled to the release temperature, the tube structure 10 is returned to the retracted position in FIG. 3c so that the apparatus can commence the next heating and cooling cycle. During this next cycle, the tube structure 10 seals a different polymer structure or a different portion of the same polymer structure. If the tube structure 10 seals a different polymer structure, the polymer structure 12 sealed in the prior cycle is removed and the different polymer structure is placed opposite the tube structure 10 before the tube structure 10 is moved to the extended position. If the tube structure 10 seals a different portion of the same polymer structure 12, the polymer structure 12 is shifted to place this different portion opposite the tube structure 10 before the tube structure 10 is moved to the extended position. To maximize the cycle speed, any handling and movement of polymer structures is preferably done automatically instead of manually.

An advantage of the apparatus and method embodying the present invention is that the cooling medium uniformly cools the strip 10b from one end of the tube structure 10 to the other end thereof. During the heating step discussed above, the electric current I heats the strip 10b to a high temperature but only causes a minimal increase in the temperature of the tube 10a. As the cooling medium flows down the length of the tube 10a, the cooling medium directly contacts only the slightly heated tube 10a and not the highly heated strip 10b. Therefore, the cooling medium does not experience a significant rise in its temperature from one end of the tube 10a to the other end. In other words, the cooling medium has a similar temperature at opposite ends of the tube 10a. As a result, the cooling medium is equally effective at cooling the strip 10b throughout its length.

By limiting the amount of heat generating surface on the tube structure 10 to the outer strip 10b, it is possible to maximize the speed of cooling the strip 10b when using a cooling medium such as fluid or air with a fixed heat capacity. Under the construction described above, it is possible to attain heating and cooling cycles at the heated strip 10b of the tube structure 10 of less than 0.5 seconds. At such fast cycle speeds, the process becomes feasible for commodity production such as plastics processing.

Using the direct contact of the heated strip 10b of the tube structure 10 on a polymer structure to generate heat seals eliminates the need for release materials such as Teflon tape. Release of the heated strip 10b from the polymer structure is accomplished by cooling the strip 10b to a temperature that facilitates that release. Because a non-conductive heat barrier such as Teflon tape is absent from the heat conduction path between the heated strip 10b and the polymer structure, the heat conduction from the strip 10b to the polymer structure is enhanced.

While the present invention has been described with reference to one or more particular embodiments, those skilled in the art will recognize that many changes may be made thereto without departing from the spirit and scope of the present invention. For example, although the strip 10b in FIG. 1 extends continuously along the length of the tube structure 10, the strip may alternatively extend intermittently along the length of the tube structure 10. An intermittent strip would create a heat seal having alternating sealed and non-sealed areas. Each of these embodiments and obvious variations thereof is contemplated as falling within the spirit and scope of the claimed invention, which is set forth in the following claims.

What is claimed is:

1. A heat sealing apparatus comprising:
a tube structure having a conductive hollow tube and a conductive strip, the tube being comprised of a first conductive material having a first electrical resistivity and a first coefficient of thermal expansion, the strip being comprised of a second conductive material having a second electrical resistivity less than the first resistivity and a second coefficient of thermal expansion, a difference between said second coefficient of thermal expansion and said first coefficient of thermal expansion being no greater than about 11.3% of said first coefficient of thermal expansion, the strip being connected along its entire length to only a portion of an outer surface of the tube and extending along a length of the tube; and
a current source supplying a current to said tube structure, said strip heating to a sealing temperature in response to said current and a temperature of said hollow tube being only minimally increased in response to said current.

2. The apparatus of claim 1, wherein the first and second conductive materials are selected such that a ratio of the first resistivity over the second resistivity is at least about 10.

3. The apparatus of claim 1, wherein the strip has a thickness less than or equal to a thickness of the tube.

4. The apparatus of claim 1, further including a cooling medium source, coupled to the tube structure, for delivering a cooling medium to the tube structure.

5. The apparatus of claim 1, wherein the cooling medium is selected from a group consisting of fluid and air, and wherein the cooling medium has a temperature less than or equal to about 40 degrees Fahrenheit.

6. The apparatus of claim 1, wherein the first conductive material is nickel-chromium alloy and the second conductive material is Nickel.

7. The apparatus of claim 1, wherein the strip is plated onto the portion of the outer surface of the tube.

8. The apparatus of claim 1, wherein the strip occupies no more than about 50 percent of the outer surface of the tube.

9. The apparatus of claim 8, wherein the tube is cylindrical.

10. The heat sealing apparatus of claim 1 wherein said difference between said second coefficient of thermal expansion and said first coefficient of thermal expansion is no greater than about 10% of said first coefficient of thermal expansion.

11. A heat sealing apparatus comprising:
a tube structure having a conductive hollow tube and a conductive strip, the tube being comprised of a first conductive material having a first electrical resistivity and a first coefficient of thermal expansion, the strip being comprised of a second conductive material having a second electrical resistivity less than the first resistivity and a second coefficient of thermal expansion, a difference between said second coefficient of thermal expansion and said first coefficient of thermal expansion being no greater than about 11.3% of said first coefficient of thermal expansion, the strip being connected along its entire length to only a portion of an outer surface of the tube and extending along a length of the tube;
means for passing an impulse of electric current through the tube structure to heat the strip, said strip heating to a sealing temperature in response to said current and said conductive hollow tube increasing minimally in temperature in response to said current and dissipating heat from said strip following termination of said impulse of electric current; and
means for passing a cooling medium through the hollow tube to cool the heated strip.

12. The apparatus of claim 11, wherein the first and second conductive materials are selected such that a ratio of the first resistivity over the second resistivity is at least about 10.

13. The apparatus of claim 11, wherein the means for passing an impulse of electric current through the tube structure includes a DC current source connected in series with the tube structure.

14. The apparatus of claim 11, wherein the means for passing a cooling medium through the hollow tube includes a cooling medium source for delivering a cooling medium that flows through the tube.

15. The apparatus of claim 11, wherein the first conductive material is nickel-chromium alloy and the second conductive material is Nickel.

16. The apparatus of claim 11, wherein the strip is plated onto the portion of the outer surface of the tube.

17. The apparatus of claim 11, wherein the strip occupies no more than about 50 percent of the outer surface of the tube.

18. The apparatus of claim 17, wherein the tube is cylindrical.

19. The apparatus of claim 11, wherein the strip has a thickness less than or equal to a thickness of the tube.

20. The heat sealing apparatus of claim 11 wherein said difference between said second coefficient of thermal expansion and said first coefficient of thermal expansion is no greater than about 10% of said first coefficient of thermal expansion.

21. A heat sealing apparatus comprising:
a hollow tube comprised of nickel-chromium alloy and having an outer surface;
a nickel strip plated to a portion of said outer surface of said tube, and extending along a length of said tube; and
a current source adapted to provide current in parallel through said tube and said strip, said nickel strip being heated to a sealing temperature in response to said current, said hollow tube having a minimal temperature increase in response to said current and dissipating said heat from said nickel strip.

22. The heat sealing apparatus of claim 21 wherein said hollow tube has a thickness of about 0.004 inch and said nickel strip has a thickness of about 0.002 inch.

23. A heat sealing apparatus comprising:
a hollow tube comprised of nickel-chromium alloy and having a thickness of approximately 0.004 inches, said hollow tube having an outer surface, said outer surface having a circumference;
a nickel strip plated to said outer surface and covering approximately one quarter of said circumference of said outer surface, said nickel strip having a thickness of about 0.002 inches; and
a current source adapted to provide current in parallel through said tube and said strip, said current heating said nickel strip to a sealing temperature and increasing the temperature of said hollow tube only minimally, said hollow tube dissipating the heat from said nickel strip.

* * * * *